United States Patent Office.

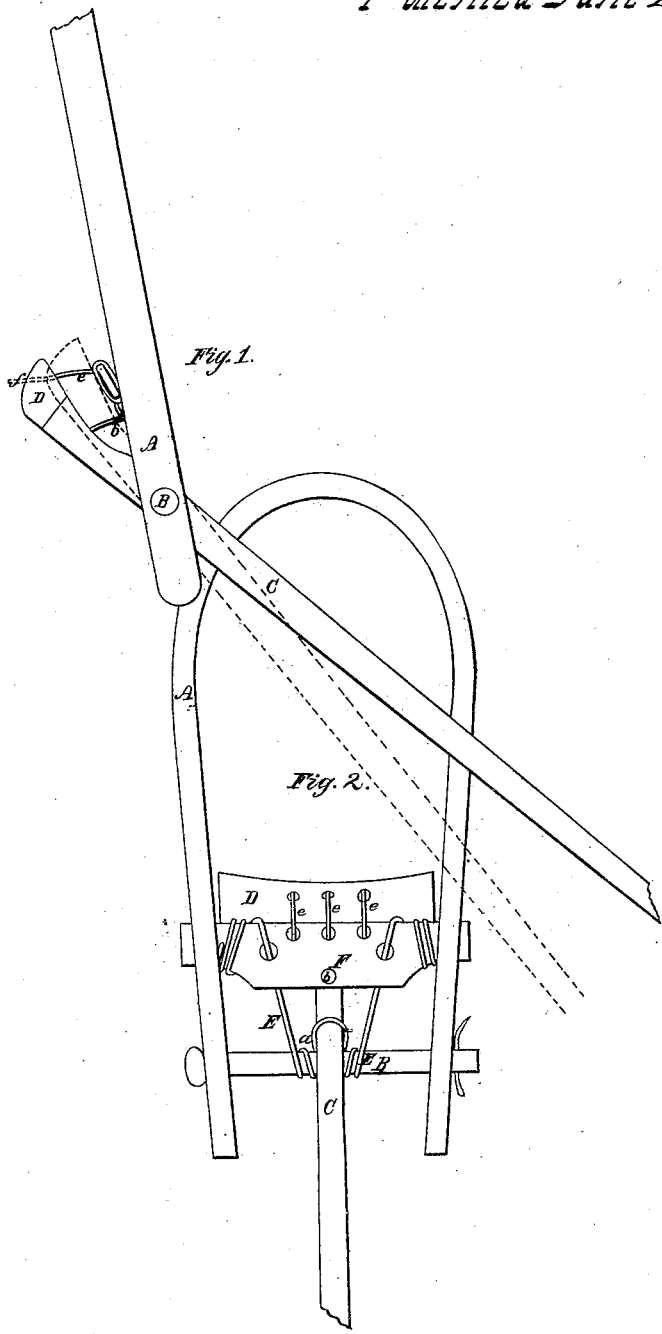

NELSON SILVESTER, OF WEYMOUTH, OHIO.

Letters Patent No. 65,440, dated June 4, 1867.

---

IMPROVEMENT IN HORSE AND CATTLE POKE.

---

*The Schedule referred to in these Letters Patent and making part of the same.*

---

TO ALL WHOM IT MAY CONCERN:

Be it known that I, NELSON SILVESTER, of Weymouth, in the county of Medina, and State of Ohio, have invented certain new and useful improvements in Horse and Cattle Pokes; and I do hereby declare that the following is a full and complete description of the same, reference being had to the accompanying drawings, making a part of this specification, in which—

Figure 1 is a side view of the poke.

Figure 2 is a front view of the same.

Like letters refer to like parts in the different views presented.

This poke consists of a bow, A, of the ordinary shape, and secured by the pin B. To this pin is attached the tongue C. To the end of this tongue is fastened the cross-piece D, for a purpose hereafter shown. Around the pin and tongue at $a$ is wound the spring E, as shown in fig. 2, and connects the plate F to the pin and tongue, as shown. The guide $b$ aids to keep the plate in place. To this plate are attached the spikes or points $e$, the sharp ends of which are hidden in the cross-piece D. The bow A is placed around the neck of the animal, and hangs in the position shown in fig. 1, the cross-piece D resting against the breast, and the tongue projecting outward as shown. When the animal approaches the fence or other obstruction which he wishes to remove, the tongue coming in contact with it is pressed downward, as shown by the dotted lines in fig. 1. This and also the pressure of the chest against the cross-piece pushes it close up to the plate F. This uncovers the spikes, which, protruding through the cross-piece, as shown by the dotted lines $f$, pierce its chest and cause it to withdraw, when, the pressure being removed from the tongue and cross-piece, it is sprung back in its first position by the springs E, and the points of the spikes are again hidden in the cross-piece. When the animal is grazing, the tongue rests upon the ground, and is not in the way, or does not discommode it in the least. Any desired arrangement of springs, the equivalent of the ones shown, may be used at $a$.

What I claim as my improvement, and desire to secure by Letters Patent, is—

Spring E, plate F, and spikes $e$, in combination with tongue C, cross-piece D, pin $b$, and bow A, substantially as and for the purpose set forth.

NELSON SILVESTER.

Witnesses:
W. H. BURRIDGE,
E. E. WAITE.